(12) United States Patent
Kim (10) Patent No.: US 8,169,578 B2
(45) Date of Patent: May 1, 2012

(54) METHOD OF DRIVING A LIQUID CRYSTAL DISPLAY DEVICE WITH SPECIFIC STEPS OF SEQUENTIALLY APPLYING CONTROL SIGNALS AND GATE SIGNALS TO RESPECTIVE FOUR THIN FILM TRANSISTORS

(75) Inventor: Woo Hyun Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 336 days.

(21) Appl. No.: 12/289,150

(22) Filed: Oct. 21, 2008

(65) Prior Publication Data

US 2009/0122005 A1 May 14, 2009

Related U.S. Application Data

(62) Division of application No. 11/012,130, filed on Dec. 16, 2004, now Pat. No. 7,456,923.

(30) Foreign Application Priority Data

Dec. 17, 2003 (KR) .................. 10-2003-0092697

(51) Int. Cl.
*G02F 1/136* (2006.01)
*G02F 1/141* (2006.01)
*G02F 1/1345* (2006.01)

(52) U.S. Cl. ............ 349/139; 349/42; 349/43; 349/149; 349/151; 45/92; 257/59; 257/72

(58) Field of Classification Search ............. 349/42, 349/43, 139, 151, 152; 345/92; 257/59, 257/72
See application file for complete search history.

(56) References Cited

U.S. PATENT DOCUMENTS

| 4,870,399 | A | * | 9/1989 | Carlson | .................... 345/55 |
| 5,175,446 | A | * | 12/1992 | Stewart | .................... 326/105 |
| 5,668,032 | A | | 9/1997 | Holmberg et al. | |
| 6,310,594 | B1 | | 10/2001 | Libsch et al. | |
| 6,812,494 | B2 | | 11/2004 | Mochizuki et al. | |
| 6,850,216 | B2 | * | 2/2005 | Akimoto et al. | ............... 345/90 |
| 7,023,419 | B2 | | 4/2006 | Park | |

* cited by examiner

*Primary Examiner* — Huyen Ngo (74) *Attorney, Agent, or Firm* — McKenna Long & Aldridge LLP

(57) ABSTRACT

A liquid crystal display device and a driving method thereof for reducing the number of data lines and the number of data drive integrated circuits corresponding thereto are disclosed. In the device, a plurality of gate lines is provided in a direction crossing a plurality of data lines. First and second control lines are provided in a direction being parallel to the gate lines. First liquid crystal cells are provided at one side on a basis of the data lines. Second liquid crystal cells are provided at other side on a basis of the data lines. A first switching part is provided for each first liquid crystal cell to apply video signals supplied from the data lines to the first liquid crystal cells under control of the first control line and the gate line. A second switching part is provided for each second liquid crystal cell to apply video signals supplied from the data lines to the second liquid crystal cells under control of the second control line and the gate line.

2 Claims, 8 Drawing Sheets

METHOD OF DRIVING A LIQUID CRYSTAL DISPLAY DEVICE WITH SPECIFIC STEPS OF SEQUENTIALLY APPLYING CONTROL SIGNALS AND GATE SIGNALS TO RESPECTIVE FOUR THIN FILM TRANSISTORS

This application is a divisional of prior application Ser. No. 11/012,130, filed Dec. 16, 2004, now U.S. Pat. No. 7,456,923, and claims the benefit of Korean Patent Application No. P2003-92697, filed in Korea on Dec. 17, 2003, which is hereby incorporated by reference for all purposes as if fully set forth herein.

BACKGROUND OF THE INVENTION

1. Field of the Invention

This invention relates to a liquid crystal display, and more particularly to a liquid crystal display device and a driving method thereof that are adaptive for reducing the number of data lines as well as the number of data drive integrated circuits corresponding thereto.

2. Description of the Related Art

Generally, a liquid crystal display (LCD) controls the light transmittance of a liquid crystal using an electric field, thereby displaying a picture. To achieve this, the LCD includes a liquid crystal display panel having a pixel matrix and a driving circuit for driving the liquid crystal display panel. The driving circuit drives the pixel matrix such that picture information can be displayed on the display panel.

Figure 1:
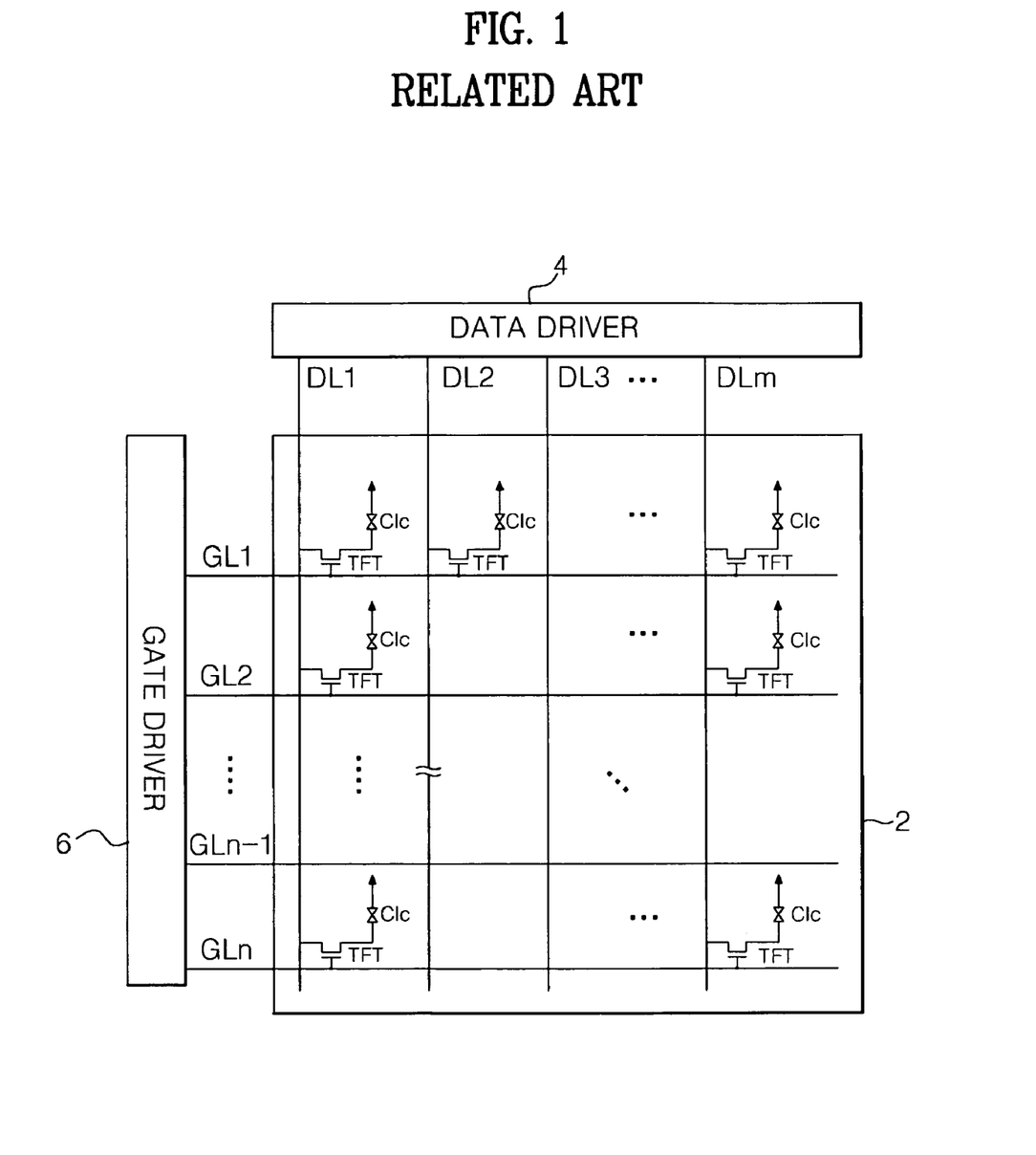
FIG. 1 is a block circuit diagram illustrating a configuration of a conventional liquid crystal display.

FIG. 1 illustrates a conventional liquid crystal display device.

Referring to FIG. 1, the conventional LCD includes a liquid crystal display panel 2, a data driver 4 for driving data lines DL1 to DLm of the liquid crystal display panel 2, and a gate driver 6 for driving gate lines GL1 to GLn of the liquid crystal display panel 2.

The liquid crystal display panel 2 has thin film transistors TFT each of which is provided at each crossing of the gate lines GL1 to GLn and the data lines DL1 to DLm and liquid crystal cells connected to the thin film transistors TFT and arranged in a matrix type.

The gate driver 6 sequentially applies a gate signal to each gate line GL1 to GLn in response to a control signal from a timing controller (not shown). The data driver 4 converts data R, G and B from the timing controller into analog video signals to thereby apply video signals for one horizontal line to the data lines DL1 to DLm every one horizontal period when a gate signal is applied to each gate line GL1 to GLn.

The thin film transistor TFT applies a signal from the data lines DL1 to DLm to the liquid crystal cell in response to a control signal from the gate lines GL1 to GLn. The liquid crystal cell can be equivalently expressed as a liquid crystal capacitor Clc because it has a common electrode opposed to a pixel electrode connected to the thin film transistor TFT with a liquid crystal therebetween. Such a liquid crystal cell includes a storage capacitor (not shown) connected to a prestage gate line in order to keep the data voltage charged in the liquid crystal capacitor Clc until the next data voltage is charged therein.

The liquid crystal cells of such a related art conventional LCD has a number of vertical lines equal to the number (i.e., m) of the data lines DL1 to DLm because they are provided at crossings of the gate lines DL1 to DLn and the data lines DL1 to DLm. In other words, the liquid crystal cells are arranged in a matrix type in such a manner to make m vertical lines and n horizontal lines.

The related art LCD requires m data lines DL1 to DLm so as to drive the liquid crystal cells having m vertical lines. Therefore, the related art LCD has a drawback in that a number of data lines DL1 to DLm should be provided to drive the liquid crystal display panel 2 and hence process time and a manufacturing cost are wasted. Furthermore, the related art LCD has a problem in that because a large number of data drive integrated circuits (IC's) are included in the data driver 4 so as to drive the m data lines DL1 to DLm, the manufacture cost is high.

SUMMARY OF THE INVENTION

Accordingly, it is an advantage of the present invention to provide a liquid crystal display device and a driving method thereof that are adaptive for reducing the number of data lines as well as the number of data drive integrated circuits corresponding thereto.

In order to achieve these and other advantages of the invention, a liquid crystal display device according to one aspect of the present invention includes a plurality of data lines; a plurality of gate lines provided in a direction crossing the data lines; first and second control lines provided in a direction being parallel to the gate lines; first liquid crystal cells provided at one side of the data lines; second liquid crystal cells provided at the other side of the data lines; a first switching part provided for each first liquid crystal cell to apply video signals supplied from the data lines to the first liquid crystal cells under control of the first control line and the gate line; and a second switching part provided for each second liquid crystal cell to apply video signals supplied from the data lines to the second liquid crystal cells under control of the second control line and the gate line.

The liquid crystal display device further includes a gate driver for sequentially applying a gate signal to the gate lines during an ½ frame interval; a data driver for applying said video signals to the data lines when said gate signal is applied to the gate lines; and a control signal supplier for supplying control signals alternated for each ½ frame unit to the first and second control lines.

In the liquid crystal display device, the first switching part includes a first thin film transistor connected to the gate line to be turned on when said gate signal is applied, thereby receiving said video signal; and a second thin film transistor turned on when said control signal is applied to the first control line to apply said video signal to the first liquid crystal cell.

In the liquid crystal display device, the second switching part includes a third thin film transistor connected to the gate line to be turned on when said gate signal is applied, thereby receiving said video signal; and a fourth thin film transistor turned on when said control signal is applied to the second control line to apply said video signal to the second liquid crystal cell.

The first and second liquid crystal cells receive said video signals alternately for each ½ frame unit in response to said control signals applied alternately for each ½ frame unit.

In the liquid crystal display device, the first liquid crystal cells and the first switching part are provided at odd-numbered vertical lines while the second liquid crystal cells and the second switching part are provided at even-numbered vertical lines.

Alternatively, the first liquid crystal cells and the first switching part are provided at even-numbered vertical lines while the second liquid crystal cells and the second switching part are provided at odd-numbered vertical lines.

A method of driving a liquid crystal display device according to another aspect of the present invention includes applying video signals corresponding to data to first liquid crystal cells positioned at the ith vertical line (wherein i is an even number or an odd number) during a first-half ½ frame interval of one frame interval; and applying said video signals corresponding to said data to second liquid crystal cells positioned at the (i+1)th vertical line during a second-half ½ frame interval of said one frame interval.

In the method, said step of applying said video signals to the first liquid crystal cells includes applying a first control signal to turn on a first thin film transistor included in a first switching part connected to each of the first liquid crystal cells; sequentially applying a gate signal to all the gate lines to sequentially turn on each second thin film transistor included in the first switching part; and applying said video signals to the data lines when said gate signal is applied.

In the method, said step of applying said video signals to the second liquid crystal cells includes applying a second control signal to thereby turn on a third thin film transistor included in a second switching part connected to each of the second liquid crystal cells; sequentially applying said gate signal to all the gate lines to sequentially turn on each fourth thin film transistor included in the second switching part; and applying said video signals to the data lines when said gate signal is applied.

Said first and second control signals are applied in such a manner as to alternate with each other for each ½ frame interval.

BRIEF DESCRIPTION OF THE DRAWINGS

These and other advantages of the invention will be apparent from the following detailed description of the embodiments of the present invention with reference to the accompanying drawings, in which.

DETAILED DESCRIPTION OF THE PREFERRED EMBODIMENT

Reference will now be made in detail to embodiments of the present invention, examples of which are illustrated in the accompanying drawings.

Hereinafter, embodiments of the present invention will be described in detail with reference to FIGS. 2 to 7.

Figure 2:
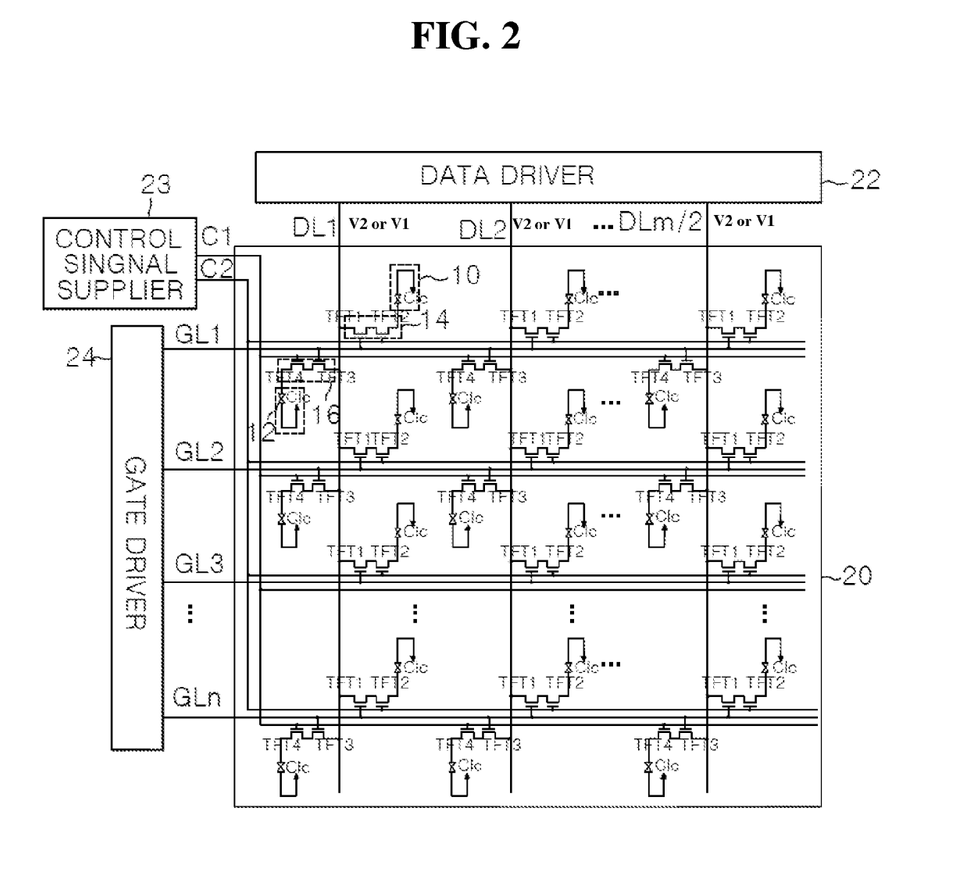
FIG. 2 is a block circuit diagram illustrating a configuration of a liquid crystal display according to a first embodiment of the present invention.

FIG. 2 schematically shows a liquid crystal display (LCD) according to a first exemplary embodiment of the present invention.

Referring to FIG. 2, the LCD according to the first embodiment of the present invention includes a liquid crystal display panel 20, a data driver 22 for driving data lines DL1 to DLm/2 of the liquid crystal display panel 20, a gate driver 24 for driving gate lines GL1 to GLn of the liquid crystal display panel 20, and a control signal supplier 23 for supplying control signals to first and second control lines C1 and C2 provided in parallel to the gate lines GL1 to GLn.

The liquid crystal display panel 20 is comprised of first and second liquid crystal cells 10 and 12 provided alternately at crossings of the gate lines GL1 to GLn and the data lines DL1 to DLm/2, a first switching part 14 for driving the first liquid crystal cell 10, and a second switching part 16 for driving the second liquid crystal cell 12.

The first and second liquid crystal cells 10 and 12 can be equivalently expressed as a liquid crystal capacitor Clc because they comprise a common electrode opposed to a pixel electrode connected to each of the first and second switching parts 14 and 16 and having a liquid crystal therebetween. Herein, each of the first and second liquid crystal cells 10 and 12 includes a storage capacitor (not shown) connected to a pre-stage gate line (or common electrode) or the control signal lines C1 and C2 in order to keep a voltage of a video signal charged in the liquid crystal capacitor Clc until the next video signal is applied.

The first liquid crystal cell 10 and the first switching part 14 are provided at, for example, the right side of the data line DL, that is, at even-numbered vertical lines. The second liquid crystal cell 12 and the second switching part 16 are provided at the left side of the data line DL, that is, at odd-numbered vertical lines. In other words, the first and second liquid crystal cells 10 and 12 are provided an opposite sides of a single data line DL running between them. In this case, the first and second liquid crystal cells 10 and 12 receive video signals from the data lines DL positioned adjacently to each other. Accordingly, the LCD according to the first embodiment of the present invention allows the number of data lines DL to be reduced to a half of that in the conventional LCD shown in FIG. 1.

Figure 4:
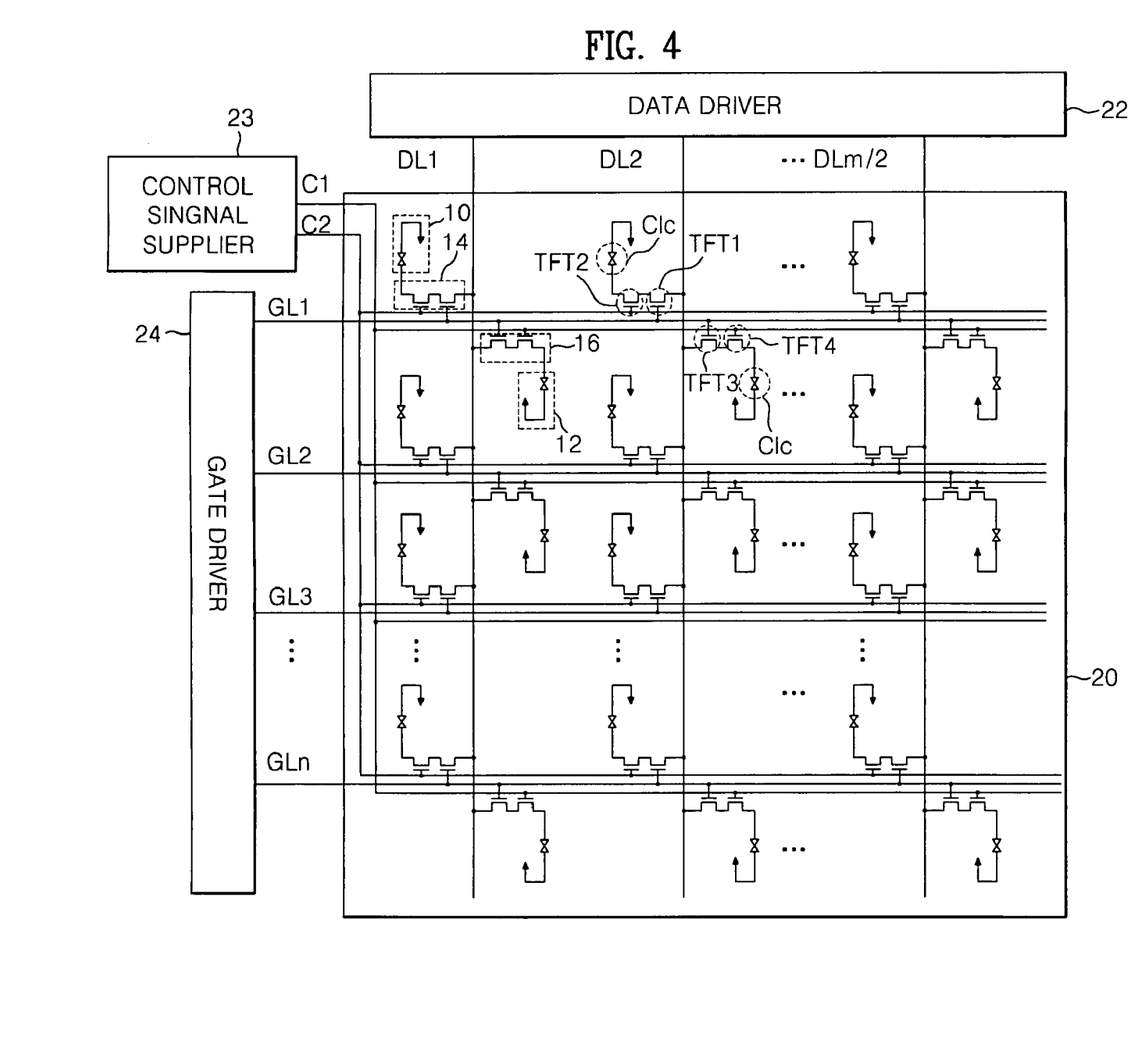
FIG. 4 is a block circuit diagram illustrating a configuration of a liquid crystal display according to a second embodiment of the present invention.

Alternatively, in the present embodiment, a position of the first and second liquid crystal cells 10 and 12 may be reversed as shown in FIG. 4. In other words, as shown in FIG. 4, the first liquid crystal cell 10 and the first switching part 14 may be provided at the left side of the data line DL while the second liquid crystal cell 12 and the second switching part 16 may be provided at the right side of the data line. In other words, the first liquid crystal cell 10 and the first switching part 14 may be provided at the odd-numbered vertical lines while the second liquid crystal cell 12 and the second switching part 16 may be provided at the even-numbered vertical lines.

The first and second control lines C1 and C2 are provided in parallel to the gate line GL (e.g., at the upper/lower sides of the gate line GL) and connected to any one of the first and second switching parts 14 and 16. Herein, the first control line C1 is connected to the second switching part 16 while the second control line C2 is connected to the first switching part 14.

The first switching part 14 for driving the first liquid crystal cell 10 includes first and second thin film transistors TFT1 and TFT2. The first thin film transistor TFT1 is connected to the data line DL and the gate line GL to be turned on when a gate signal is applied to the gate line GL. The second thin film transistor TFT2 is connected between the first thin film transistor TFT1 and the first liquid crystal cell 10 to be turned on when a second control signal is applied to the second control line C2.

The second switching part 16 for driving the second liquid crystal cell 12 includes third and fourth thin film transistors TFT3 and TFT4. The third thin film transistor TFT3 is connected to the data line DL and the gate line GL to be turned on when a gate signal is applied to the gate line GL. The fourth thin film transistor TFT4 is connected between the third thin film transistor TFT3 and the second liquid crystal cell 12 to be turned on when a first control signal is applied to the first control line C1.

Figure 3:
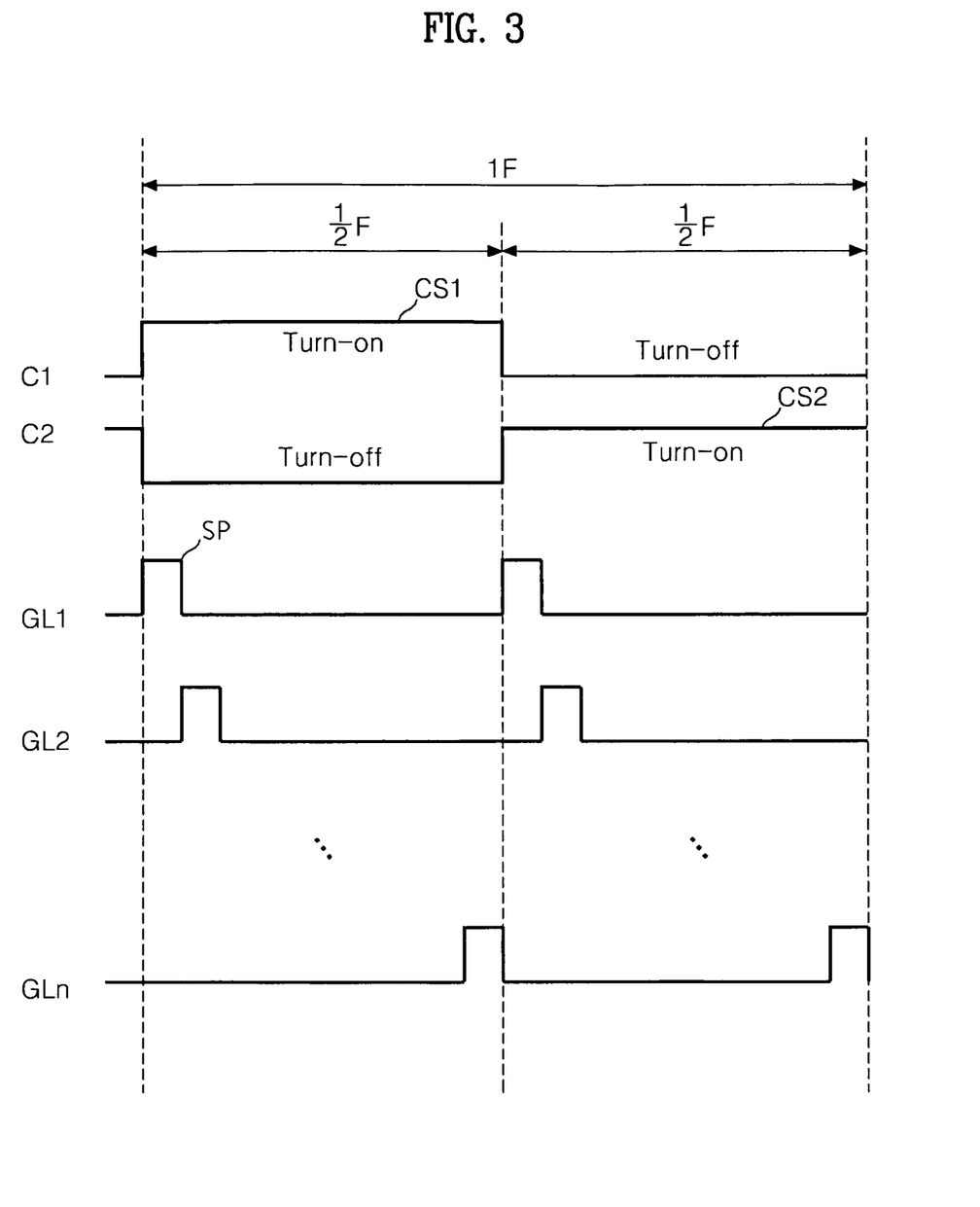
FIG. 3 is a waveform diagram of control signals applied to the control lines and gate signals applied to the gate lines shown in FIG. 2.

The gate driver 24 sequentially applies a gate signal SP to the gate lines GL1 to GLn for each ½ frame unit as shown in FIG. 3 in response to the control signal supplied from a timing controller (not shown). In other words, the gate driver 24 in the first embodiment of the present invention drives the gate lines GL1 to GLn for each ½ frame unit.

The data driver 22 converts data R, G and B signals from the timing controller into analog video signals to apply them to the data lines DL1 to DLm/2. The data driver 22 alternately applies a video signal V2 to be supplied to the first liquid crystal cell 10 and a video signal V1 to be supplied to the second liquid crystal cell 12 for each ½ frame unit. In this case, the LCD according to the first embodiment of the present invention allows the number of data lines DL1 to DLm/2 to be reduced to a half of that in the conventional LCD shown in FIG. 1, so that the number of data drive IC's included in the data driver 22 also is reduced by half.

The control signal supplier 23 alternately supplies first and second control signals CS1 and CS2 to the first and second control lines C1 and C2 for each ½ frame unit as shown in FIG. 3. For instance, the control signal supplier 23 can supply the first control signal CS1 to the first control line C1 during the first-half ½ frame interval while supplying the second control signal CS2 to the second control line C2 during the second-half ½ frame interval. Further, the control signal supplier 23 can supply the second control signal CS2 to the second control line C2 during the first-half ½ frame interval while supplying the first control signal CS1 to the first control signal C1. Alternatively, the LCD according to the present invention can supply the first and second control signals CS1 and CS2 from the timing controller without having the control signal supplier 23 separately as shown in FIG. 2.

A procedure for supplying video signals to the liquid crystal cells 10 and 12 will be described in detail.

Firstly, the first control signal CS1 to the first control line C1 during the first-half ½ frame interval. Then, the fourth thin film transistors TFT4 connected to the first control line C1 are turned on. At this time, the second thin film transistors TFT2 keep a turn-off state.

Figure 5A:
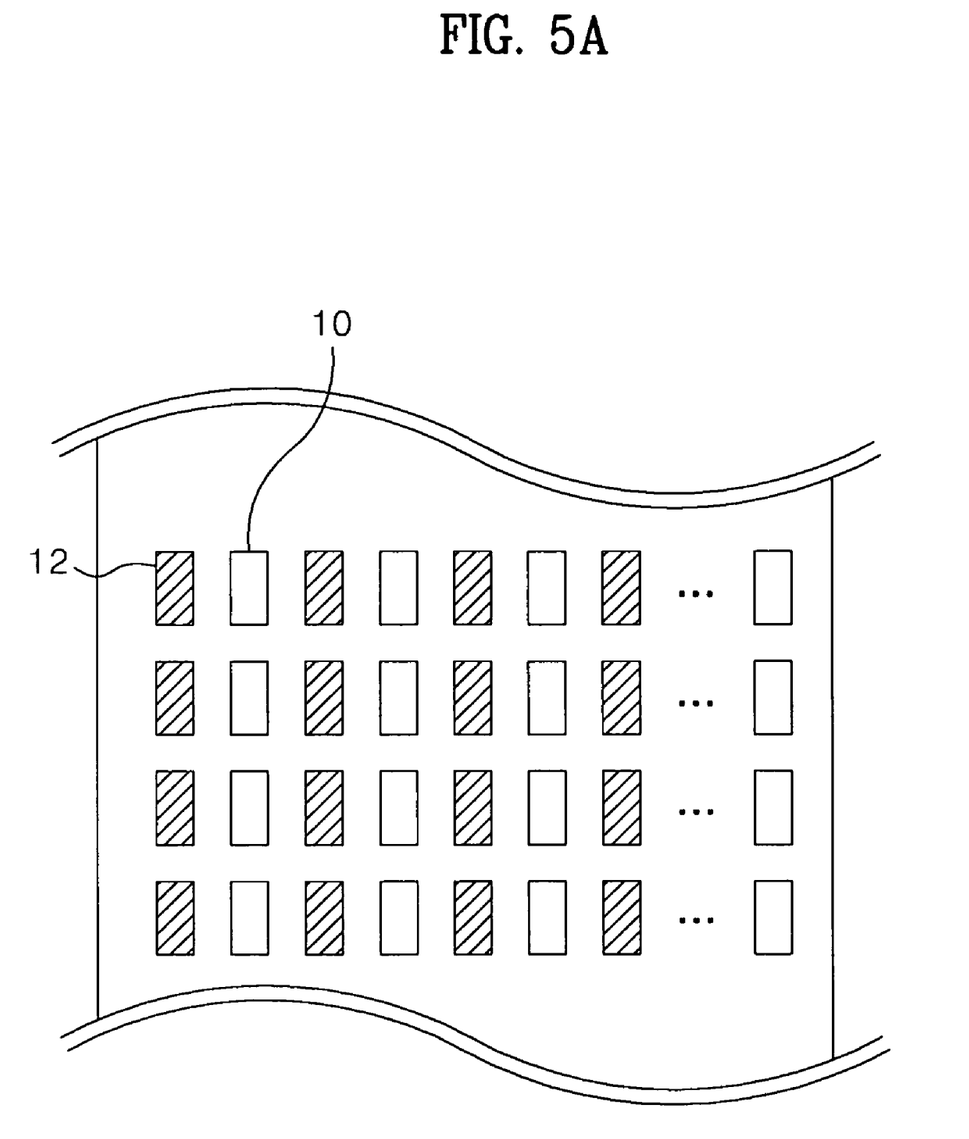
FIG. 5A and FIG. 5B depict the liquid crystal cells driven in response to the control signals shown in FIG. 3.

During the first-half ½ frame interval, the gate signal SP is sequentially applied to the gate lines GL1 to GLn. At this time, the third thin film transistor TFT3 connected to the gate line GL is turned on for each horizontal line. Video signals V1 to be supplied to the second liquid crystal cell 12 are applied to the data lines DL1 to DLm/2. Then, the video signals V1 supplied to the data lines DL1 to DLm/2 are applied, via the third and fourth thin film transistors TFT3 and TFT4, respectively, to the second liquid crystal cell 12. Thus, during the first-half ½ frame interval, the second liquid crystal cells 12 positioned at the odd-numbered vertical lines as shown in FIG. 5A are driven. Meanwhile, the first thin film transistors TFT1 also are sequentially turned on by the gate signals SP, but video signals are not applied to the first liquid crystal cell 10 because the second thin film transistors TFT2 are turned off.

Thereafter, during the second-half ½ frame interval, the second control signal CS2 is applied to the second control line C2. Then, the second thin film transistors TFT2 connected to the second control line C2 are turned on. At this time, the fourth thin film transistors TFT4 remain off.

Figure 5B:
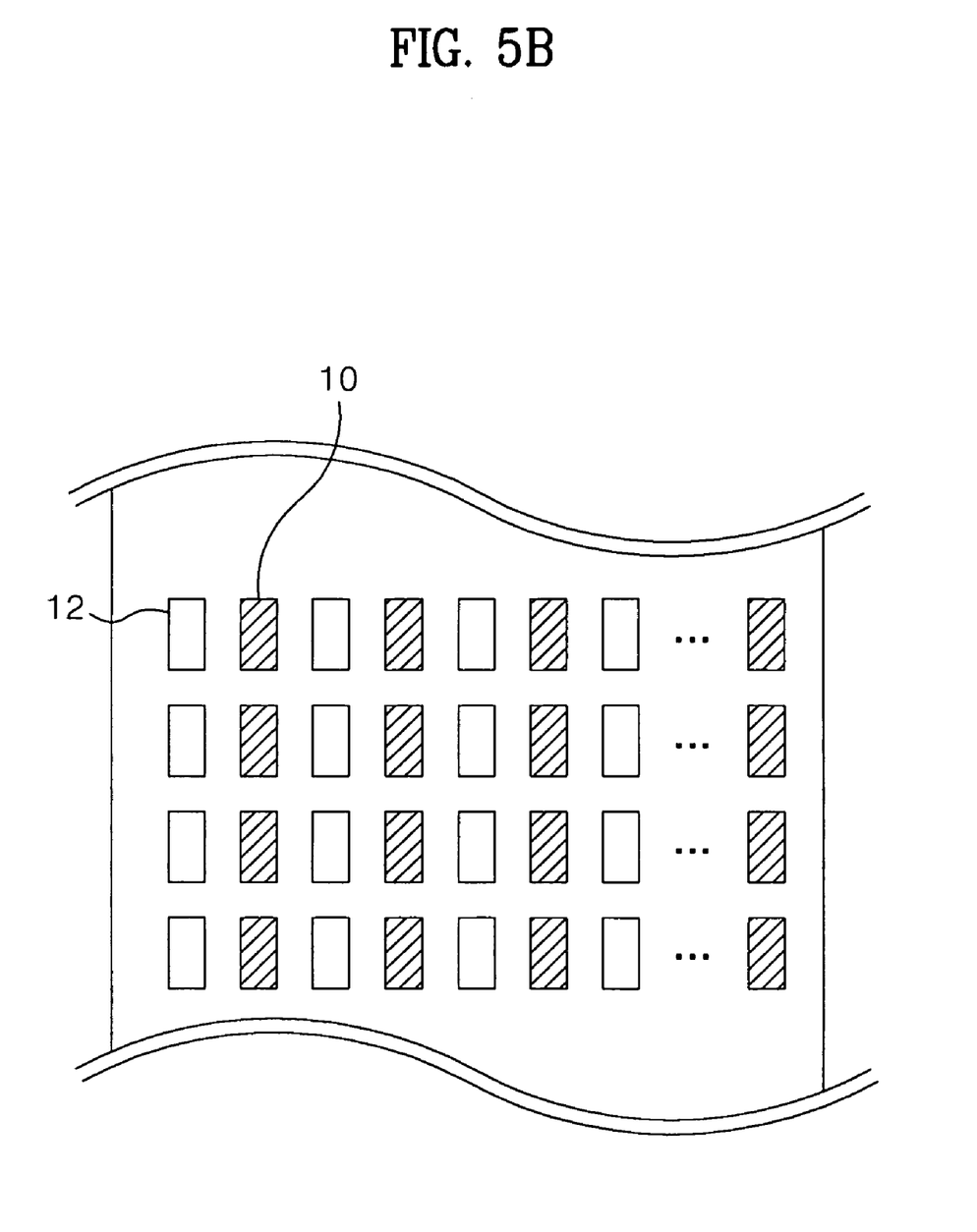

During the second-half ½ frame interval, the gate signal SP is sequentially applied to the gate lines GL1 to GLn. At this time, the first thin film transistor TFT1 connected to the gate line GL is turned on for each horizontal line. Video signals V2 to be supplied to the first liquid crystal cell 10 are applied to the data lines DL1 to DLm/2. Then, the video signals V2 supplied to the data lines DL1 to DLm/2 are applied, via the first and second thin film transistors TFT1 and TFT2, respectively, to the first liquid crystal cell 10. Thus, during the second-half ½ frame interval, the first liquid crystal cells 10 positioned at the even-numbered vertical lines as shown in FIG. 5B are driven. Meanwhile, the third thin film transistors TFT3 also are sequentially turned on by the gate signals SP, but video signals are not applied to the second liquid crystal cell 12 because the fourth thin film transistors TFT4 are turned off.

In other words, the LCD according to the first embodiment of the present invention applies the control signals CS1 and CS2 alternately for each ½ frame unit to the first and second control lines C1 and C2 to thereby alternately turn on the second thin film transistors TFT2 or the fourth thin film transistors TFT4, so that it can alternately drive the first and second liquid crystal cells 10 and 12 for each ½ frame unit. Furthermore, the LCD according to the first embodiment of the present invention supplies desired video signals to the first and second liquid crystal cells 10 and 12 positioned at the left/right sides using a single of data line DL, so that it can reduce the number of data lines DL and the number of data drive IC's to a half of the prior art, thereby reducing a manufacturing cost thereof.

Alternatively, in the present invention, the second control signal CS2 may be applied during the first-half ½ frame interval while the first control signal CS1 may be applied during the second-half ½ frame interval. Then, the first liquid crystal cells 10 positioned at the even-numbered horizontal lines as shown in FIG. 5B are driven while the second liquid crystal cells 12 positioned at the odd-numbered horizontal lines as shown in FIG. 5A are driven. In other words, the LCD according to the present invention can control the sequence in which the first and second control signals CS1 and CS2 are applied to thereby control a driving sequence of the first and second liquid crystal cells 10 and 12.

Figure 6:
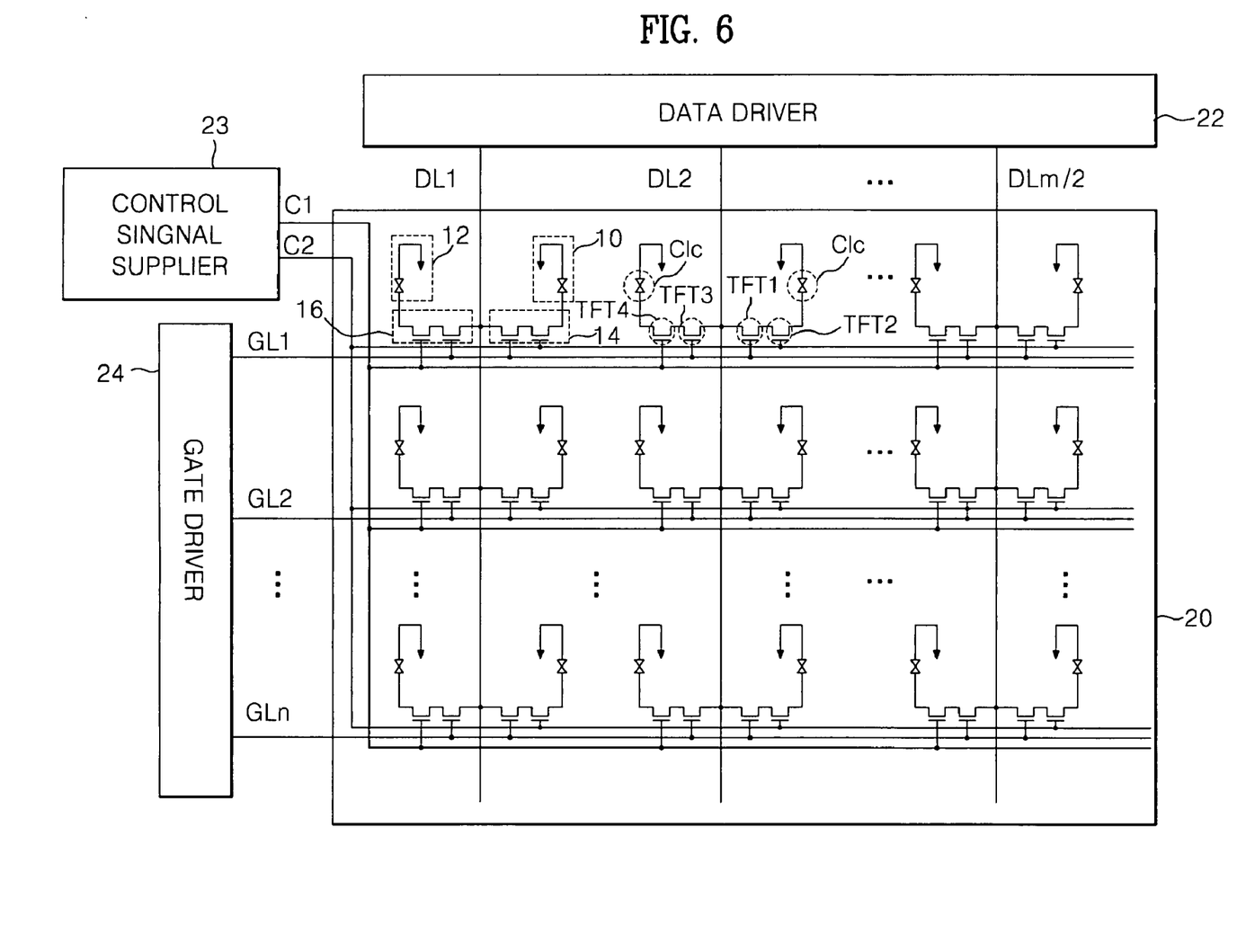
FIG. 6 is a block circuit diagram illustrating a configuration of a liquid crystal display according to a third embodiment of the present invention.
Figure 7:
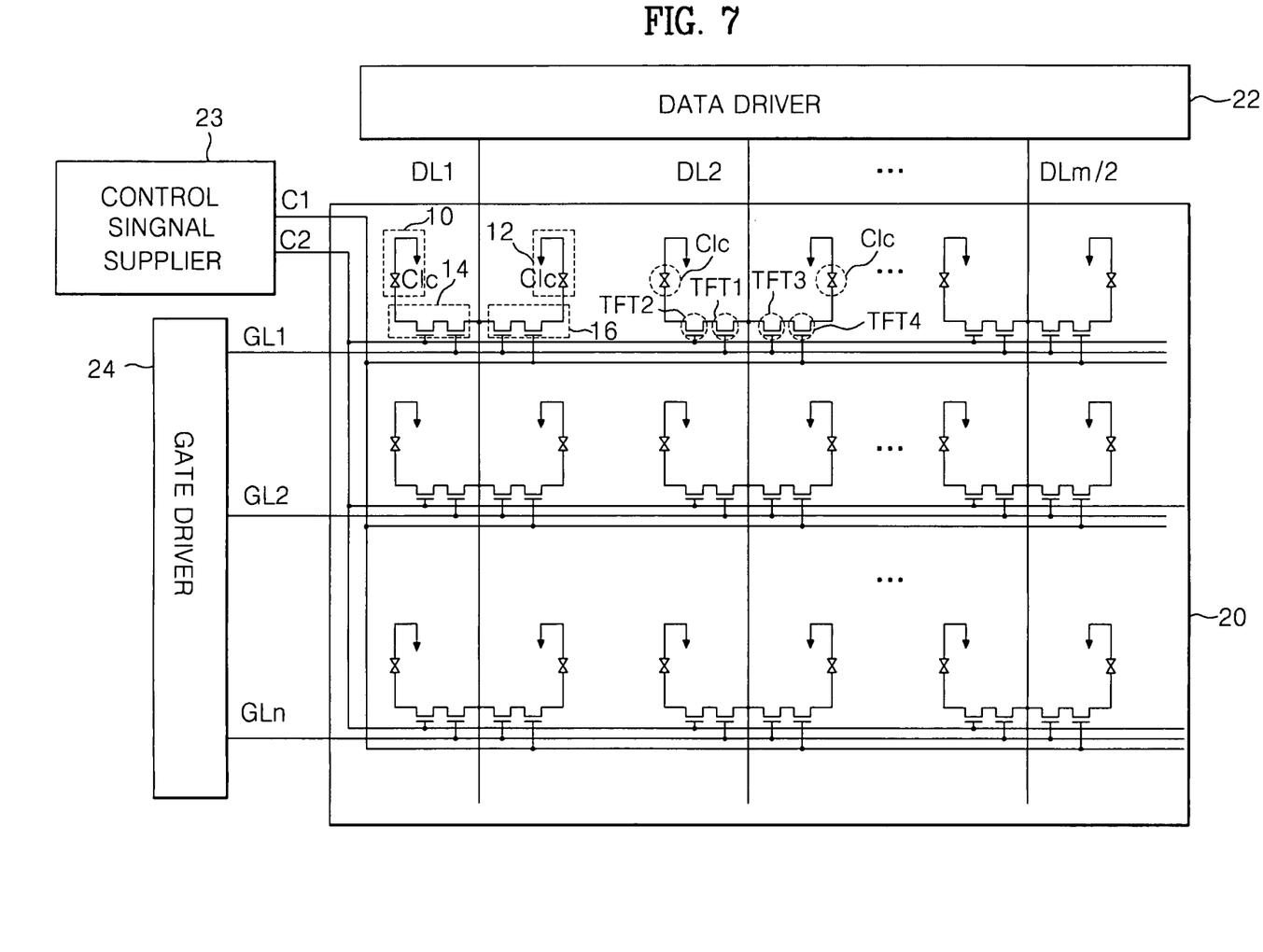
FIG. 7 is a block circuit diagram illustrating a configuration of a liquid crystal display according to a fourth embodiment of the present invention.

Alternatively, in the present invention, a shape of the liquid crystal display panel 20 can be established variously. For instance, the first and second liquid crystal cells 10 and 12 may be arranged in such a manner to be located at the upper side of the gate lines GL as shown in FIG. 6 and FIG. 7. In other words, in another embodiment of the present invention, first and second liquid crystal cells 10 and 12 positioned at the left/right sides on a basis of the data line DL can be arranged in such a manner to be located at the same horizontal line as shown in FIG. 6 and FIG. 7. In this case, the first liquid crystal cell 10 and the first switching part 14 are arranged at the even-numbered (or odd-numbered) vertical lines while the second liquid crystal cell 12 and the second switching part 16 are arranged at the odd-numbered (or even-numbered) vertical lines. A procedure for applying video signals to the liquid crystal cells 10 and 12 in another embodiment of the present invention is identical to that in the embodiment of the present invention as shown in FIG. 2 and FIG. 3.

Meanwhile, the LCD according to any one of the embodiments of the present invention is applicable to various liquid crystal panels. For instance, the LCD according to any one of the embodiments of the present invention is applicable to a TN-mode liquid crystal or an IPS-mode liquid crystal, etc.

As described above, according to the present invention, the liquid crystal cells positioned at the odd-numbered vertical lines and the liquid crystal cells positioned at the even-numbered vertical lines are alternately driven for each ½ frame unit. A single data line drives the liquid crystal cells positioned adjacently with each other at the left/right sides, so the number of data lines can be reduced to about half. Accordingly, the number of data drivers for supplying driving signals to the data lines also can be reduced to about half, thereby reducing a manufacturing cost.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A method of driving a liquid crystal display device, comprising:
    a step A of applying first video signals corresponding to second liquid crystal cells to data lines during a first-half ½ frame interval of one frame interval, wherein the second liquid crystal cells are provided at one side of each data line, wherein the first video signals are provided from a data driver;
    a step B of applying the first video signals from the data lines to the second liquid crystal cells through second switching parts under control of a first control line and gate lines, wherein each second switching part is provided for each second liquid crystal cell;
    a step C of applying second video signals corresponding to first liquid crystal cells to the data lines during a second-half ½ frame interval of the one frame interval, wherein the first liquid crystal cells are provided at the other side of each data line wherein the second video signals are provided from the data driver;
    a step D of applying the second video signals from the data lines to the first liquid crystal cells through first switching parts under control of a second control line and the gate lines, wherein each first switching part is provided for each first liquid crystal cell;
    wherein the step B comprises:
        a step B-1 of applying the first control signal to a fourth thin film transistor of the each second switching part to turn on the fourth thin film transistors during the first-half ½ frame interval, wherein the each second switching part is connected to each of the second liquid crystal cells;
        a step B-2 of sequentially applying a gate signal to all the gate lines to sequentially turn on each third thin film transistor included in the each second switching part during the first-half ½ frame interval, wherein the third thin film transistor is connected between the data line and the fourth thin film transistor;
    wherein the step D comprises:
        a step D-1 of applying the second control signal to a second thin film transistor of the each first switching part to turn on the second thin film transistors during the second-half ½ frame interval, wherein the each first switching part is connected to each of the first liquid crystal cells;
        a step D-2 of sequentially applying a gate signal to all the gate lines to sequentially turn on each first thin film transistor included in the each first switching part during the second-half ½ frame interval, wherein the first thin film transistor is connected between the data line and the second thin film transistor.

2. The method according to claim 1, wherein said first and second control signals are applied to alternate with each other for each ½ frame interval.

* * * * *